United States Patent
Wadhwa et al.

(10) Patent No.: US 7,616,778 B2
(45) Date of Patent: *Nov. 10, 2009

(54) SYSTEM AND METHOD FOR APPLYING WATERMARKS

(75) Inventors: Rohit Wadhwa, Tustin, CA (US); Man Mohan Garg, Cerritos, CA (US); Harish Thampi Syedmohammed, Lake Forest, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/186,316

(22) Filed: Aug. 5, 2008

(65) Prior Publication Data

US 2008/0292139 A1    Nov. 27, 2008

Related U.S. Application Data

(63) Continuation of application No. 11/066,908, filed on Feb. 25, 2005, now Pat. No. 7,436,978.

(51) Int. Cl.
*G06K 9/00* (2006.01)
*H04N 7/167* (2006.01)

(52) U.S. Cl. .................. 382/100; 382/232; 380/201

(58) Field of Classification Search ............... 382/100, 382/112, 113, 135, 136, 137, 138, 139, 140, 382/155, 168, 181, 132, 242, 274, 276, 305, 382/287–295, 232; 713/176, 179; 380/54, 380/201

See application file for complete search history.

(56) References Cited

U.S. PATENT DOCUMENTS

| | | | | | |
|---|---|---|---|---|---|
| 5,664,018 | A | * | 9/1997 | Leighton | 380/54 |
| 5,901,224 | A | * | 5/1999 | Hecht | 713/179 |
| 5,949,885 | A | * | 9/1999 | Leighton | 380/54 |
| 6,427,020 | B1 | * | 7/2002 | Rhoads | 382/100 |
| 7,031,492 | B1 | * | 4/2006 | Furon et al. | 382/100 |
| 7,111,170 | B2 | * | 9/2006 | Hein et al. | 713/176 |
| 7,224,820 | B2 | * | 5/2007 | Inomata et al. | 382/100 |
| 7,295,677 | B2 | * | 11/2007 | Simpson et al. | 382/100 |

* cited by examiner

*Primary Examiner*—Seyed Azarian
(74) *Attorney, Agent, or Firm*—Tucker Ellis & West LLP

(57) ABSTRACT

A system and method for selectively inserting a digital watermark into a visual rendering by an image processing device. The image processing device receives an image processing request including image data of an associated document. The request is then analyzed to determine if a watermark is to be inserted into a visual rendering of the associated document. When required, the selected watermark is then retrieved from associated memory containing a watermark repository, based upon the image processing request. The visual rendering of the associated document, incorporating the watermark, is then generated.

16 Claims, 4 Drawing Sheets

SYSTEM AND METHOD FOR APPLYING WATERMARKS

CROSS REFERENCE TO RELATED APPLICATIONS

This application is a Continuation Application of U.S. patent application Ser. No. 11/066,908 filed on Feb. 25, 2005 now U.S. Pat. No. 7,436,978.

BACKGROUND

This invention is directed to a system and method for selectively and automatically incorporating a watermark image on a document to designate a copy from an original. More particularly, this invention is directed to a system and method for use with a document processing device to insert a selected watermark image into a document to distinguish an original document from a copy.

Typical image processing devices, such as multifunction peripheral devices, include a variety of features. These features generally include printing, scanning, faxing, and copying. Advancements in copying techniques and hardware have resulted in the increasing quality of electrophotographic reproductions. The increase in quality has made it difficult to distinguish an original document from a copied document. Previous attempts have included the use of watermarks on a copy of a document. However, these attempts do not offer the ability for an administrator to selectively set the watermark image for different types of image processing operations. In addition, these attempts do not enable the selective and automatic inclusion of watermark images in both copying and printing jobs.

This invention overcomes the aforementioned problems and provides a system and method for inserting a selected watermark image on a document.

SUMMARY OF INVENTION

In accordance with the present invention, there is provided a system and methods for inserting a selected watermark image onto a document.

Further, in accordance with the present invention, there is provided a system and method for inserting a selected watermark image onto a document that is selected from a watermark repository of an image processing device.

Still further, in accordance with the present invention, there is provided a system and method for automatically inserting a selected watermark onto a document based upon the type of document processing operation to be carried out by an associated document processing device.

Still further, in accordance with present invention, there is provided a method for selectively inserting a digital watermark into a visual rendering by an image processing device. The image processing device receives an image processing request including image data representative of an associated document. It is then determined, from the received image processing request, whether to insert a watermark into a visual rendering of the associated document. The selected watermark is then retrieved from associated memory based upon the image processing request. The visual rendering of the associated document is then generated, including the image data representing the associated document and the selected watermark.

In a preferred embodiment, the image processing request includes selected image processing criteria, which is used to determine whether the watermark is to be inserted into the visual rendering of the associated document. In this embodiment, the selected image processing criteria includes at least one of a document processing type and a document type. The selected image processing criteria is set by either a user or a system administrator. In a preferred embodiment, the method further includes the step of populating a repository in the associated memory, which includes generating watermark image data, associating data representative of an identifier with the watermark image data, and storing, in the watermark repository, the watermark image data together with the associated identifier data.

Further in accordance with the present invention, there is provided a system for selectively inserting a digital watermark into a visual rendering by an image processing device. The system includes receiving means adapted for receiving an image processing request including image data representative of an associated document and determining means adapted for determining, from the received image processing request, whether a watermark is to be inserted into a visual rendering of the associated document. The system further includes retrieval means adapted for retrieving a selected watermark from an associated memory based upon the received image processing request. The system also employs generating means adapted for generating a visual rendering of the associated document, wherein the visual rendering includes the image date representative of the associated document and the selected watermark.

In a preferred embodiment, the image processing request includes data representing selected image processing criteria, wherein the determination whether a watermark is to inserted into the visual rendering of the associated document is based upon the selected image processing criteria. The selected image processing criteria includes either a document processing operation type or a document type. In this embodiment, the selected image processing criteria is set by either a system administrator or by a user. In a preferred embodiment, the system further includes means adapted for populating a watermark repository, residing in the associated memory. The watermark repository is populated by means adapted for generating data representative of a watermark image, means adapted for associating data representative of an identifier with the watermark image data, and means adapted for storing, in the watermark repository, the watermark image data together with the associated identifier data.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The accompanying drawings incorporated in a forming a part of the specification, illustrate several aspects of the present invention, and together with the description, serve to explain the principles of the invention.

DETAILED DESCRIPTION OF THE PREFERRED EMBODIMENTS

The present invention is directed to a system and method for selectively inserting a digital watermark into a visual rendering by an image processing device. As will be understood by those skilled in the art, a watermark is a glyph, icon, figure, text, or other graphical image inserted into the background of a page during output of a document. The use of watermarks is well known in the art and the various types of watermarks are incorporated herein. Watermarks, in accordance with the present invention, are incorporated into documents to indicate whether the document is a copy or original, as well as the user or administrator that requested the document is output.

Figure 1:
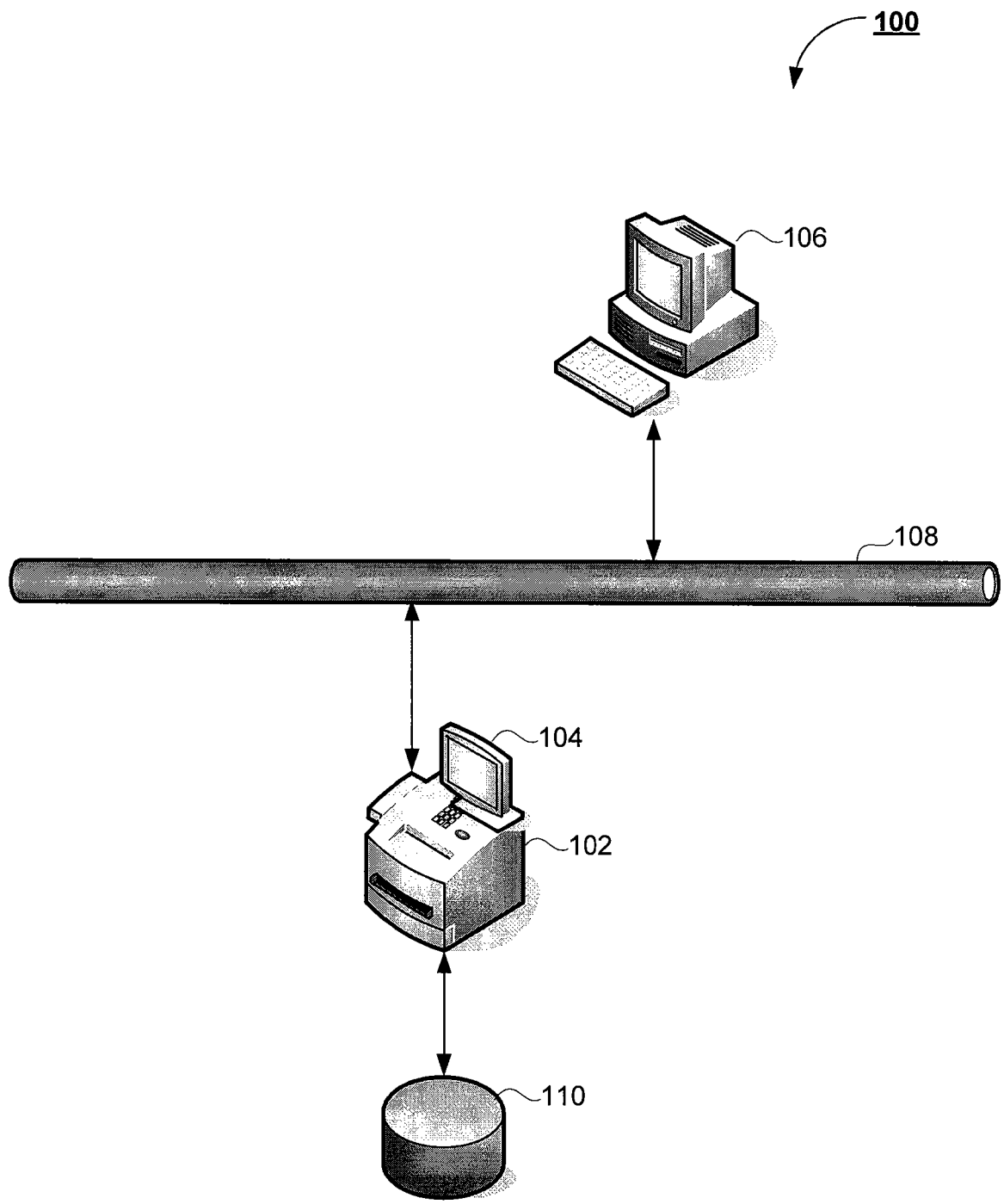
FIG. 1 is block diagram illustrating a system according to the present invention.

Turning now to FIG. 1, there is illustrated a system 100 in accordance with the present invention. As illustrated in FIG. 1, there is shown an image processing device, as illustrated by multifunction peripheral device 102, for receiving and processing electronic documents. It will be understood by those skilled in the art that the image processing device is any suitable image processing device known in the art. Such suitable image processing devices includes a copier, printer, scanner, facsimile machine, any combination thereof, and the like. Suitable commercially available image processing devices include, but are not limited to, the Toshiba e-Studio Series Controller. The multifunction peripheral device is suitably adapted to communicate with any computer network, including, without limitation, the Internet.

The multifunction peripheral device 102 suitably includes a user interface 104, in operative connection thereto. The user interface 104 is preferably a touch screen display, capable of both displaying data to a user, as well as receiving user input. The skilled artisan will appreciate that any suitable user interface known in the art, including, without limitation, an alphanumeric keypad, an LCD, and the like, are equally capable of being employed by the present invention. The multifunction peripheral device 102 suitably includes an associated memory, illustrated in FIG. 1 as data storage device 110, suitably adapted to store electronic files, including, without limitation, electronic documents, images and the like. The skilled artisan will appreciate that the data storage device 110 is any mass storage device known in the art, including, but not limited to flash memory, magnetic data storage, optical data storage and the like. As will be understood with respect to the present invention, the data storage device 110 functions as a watermark repository, storing various images and associated identifiers, for incorporation during image processing operations, as will be explained in greater detail below.

A user or system administrator accesses the multifunction peripheral device 102 via the user interface 104, to provide instructions and input in accordance with the present invention. As will be understood by those skilled in the art, for purposes of brevity, a "user" is used to include both the regular user of the device 102, as well as a system administrator. Where only an administrator is allowed access, the term "administrator" will be used. In addition, the user is capable of accessing the multifunction peripheral device 102 via a remote user interface, such as the personal computer 106, accessing the multifunction peripheral device 102 via a computer network 108. In the preferred embodiment, the personal computer 106 accesses the multifunction peripheral device 102 via any suitable web browser known in the art.

The skilled artisan will appreciate that the personal computer 106 communicates with the multifunction peripheral device 102 via any data communications channel (not shown) known in the art, including, but not limited to LAN, the Internet, directly via 802.11g (WiFi), Bluetooth, or other 802.11(X) wireless communications channels. The personal computer 106 suitably includes an associated storage device (not shown), such as a hard disk drive, for storing one or more electronic files. The personal computer 104 is shown in FIG. 1 as a desktop computer, however the skilled artisan will appreciate that this is for exemplification purposes only and the present invention is capable of using a document server, a laptop computer, a tablet computer, and the like, for storing an electronic document file and communicating the same to the multifunction peripheral device 102.

The user is able to selectively request the application of a watermark to a document via the web browser of the personal computer 106. The personal computer 106 is advantageously capable of retrieving images of watermarks from the repository 110 connected to the multifunction peripheral device 102 and displaying the same to the user. In addition, as will be explained below, the user is able to add new watermarks to the watermark repository 110 via the user interface 104 or the personal computer 106. For example, the user forwards, from the personal computer 106, to the multifunction peripheral device 102 an image to be used as a watermark. The watermark, in digital format, is then stored in the repository 110 for later use. In addition, the user, at the user interface 104, is able to add a watermark by scanning a visual rendering, e.g., a hardcopy image, at the multifunction peripheral device 102. The scanned image is then stored in the repository for later use. Furthermore, at either the multifunction peripheral device 102 user interface 104 or via the web browser at the personal computer 106, an administrator is able to set a specific watermark for use with a particular user, with a copy job, with a print job, with a scanning job, and with a facsimile job. The skilled artisan will appreciate that any combination thereof is equally capable of being set, outside the user's control by the system administrator.

Figure 2:
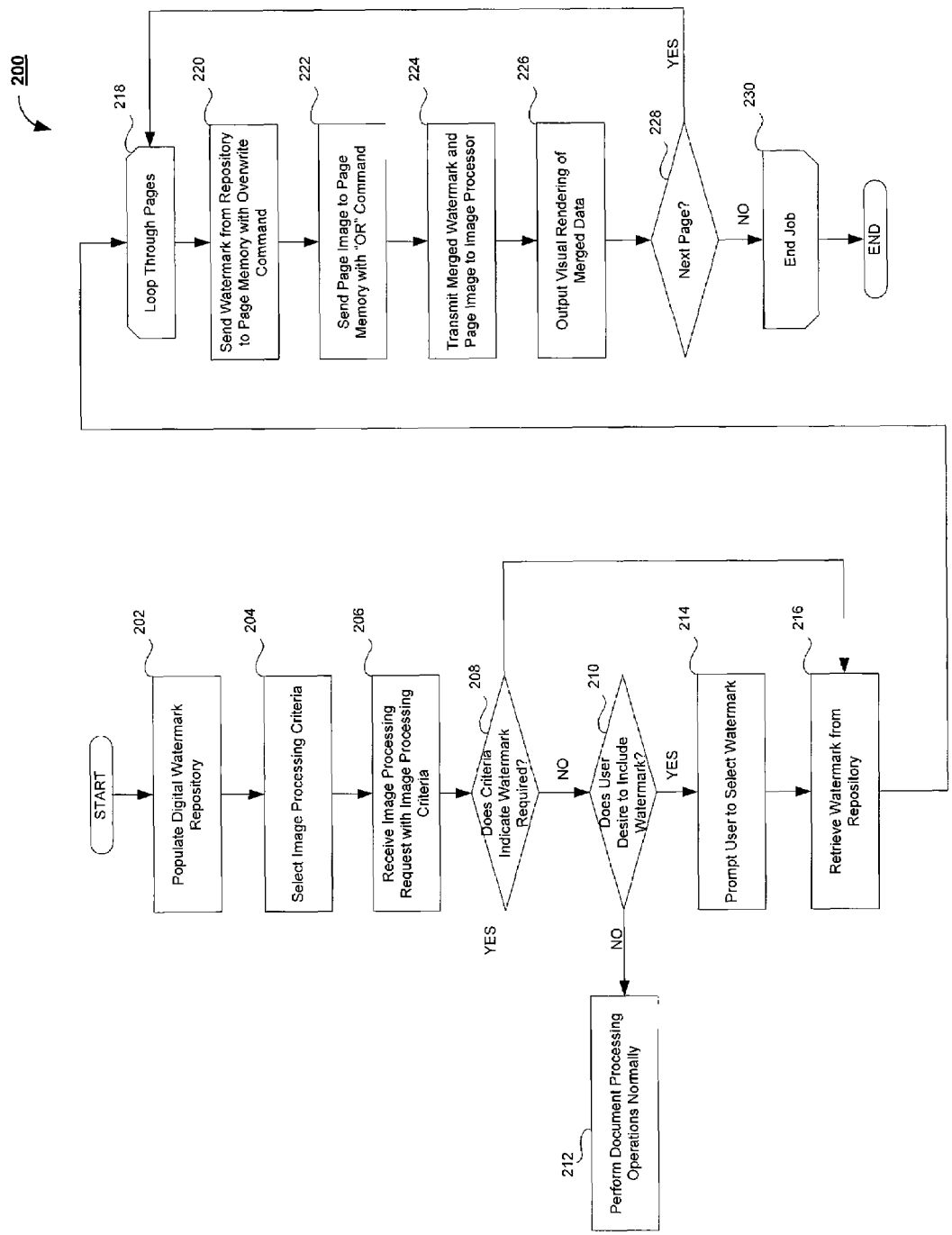
FIG. 2 is a flow chart illustrating a method according to the present invention.
Figure 3:
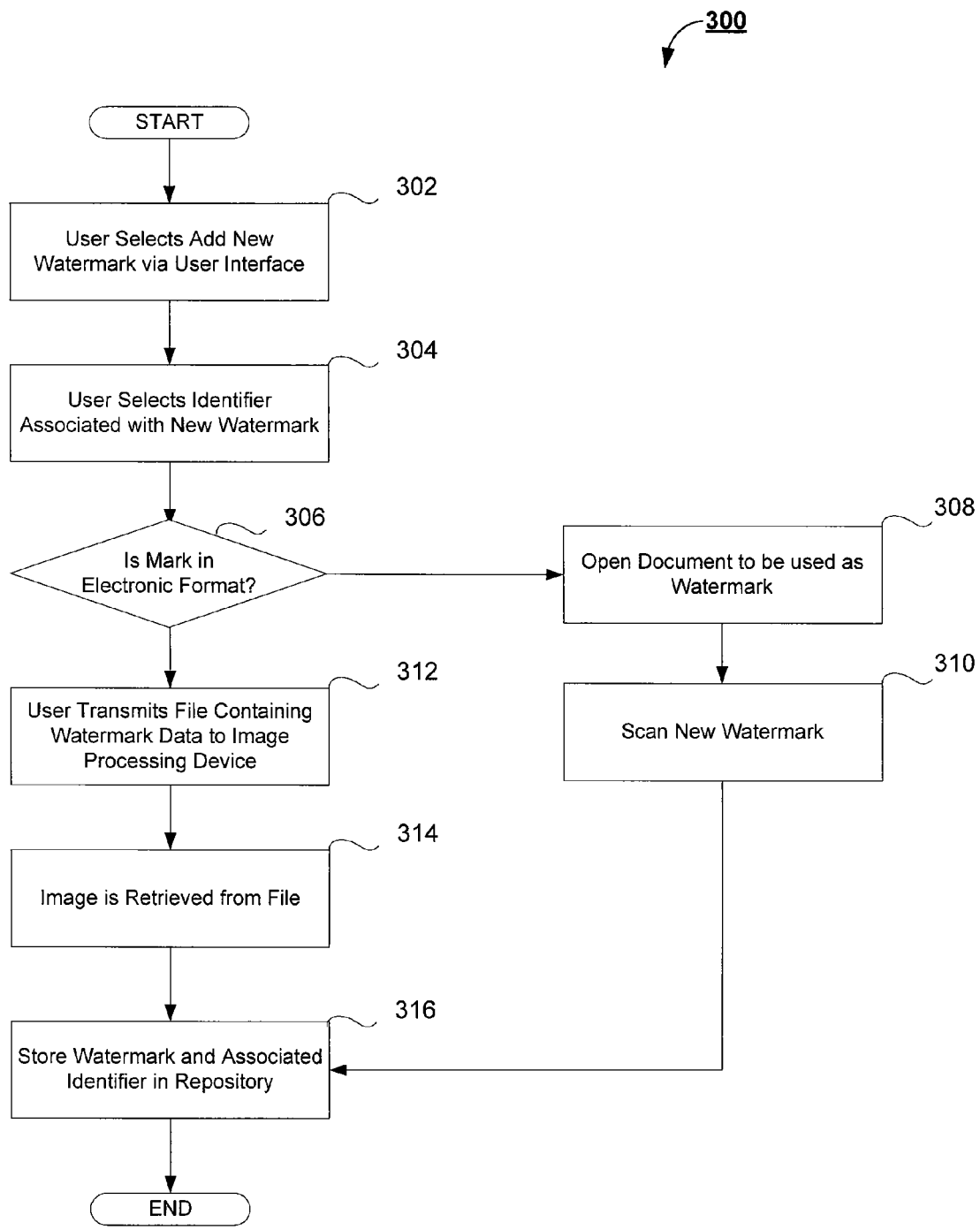
FIG. 3 is a flow chart illustrating one method of populating a watermark repository according to the present invention.

Turning now to FIG. 2, there is shown a flowchart 200 illustrating the method of selectively inserting a digital watermark into a visual rendering by an image processing device. Beginning at step 202, the watermark repository 110 is populated. The population of the repository is best understood with reference to the flowchart 300 of FIG. 3. Referring to FIG. 3, a user selects to add a new watermark image to the repository 110 at step 302. The skilled artisan will understand that such a selection is suitably made via the user interface 104 or via the personal computer 106. At step 304, the user provides an identifier to be associated with the new watermark. For example and without limitation, the user enters an alphanumeric designation for the watermark, such as a name, which is then associated with the watermark image in the repository 110. A determination is made at step 306 whether the new watermark is available in electronic file format. When the user has an electronic copy of the watermark, the user transmits the watermark to the multifunction peripheral device 102 at step 312. As will understood by those skilled in the art, suitable transmission means include, but are not limited to, electronic message transmission, recovery of the electronic file from a removable storage medium, retrieval from a URL, and the like.

At step 314, the image to be used as the new watermark is retrieved from the electronic file. The skilled artisan will appreciate that such retrieval advantageously includes using a printer driver to generate the watermark in acceptable format for inclusion in documents by the multifunction peripheral device 102. In addition, it will be appreciated by those skilled in the art that the retrieval is also capable of occurring through the use of ripping a specific image from a page containing other image data. As will be understood by those skilled in the art, an acceptable image format includes, without limitation, JPEG, GIF, TIFF, and other image file formats known in the art. This ripped image is then converted to an acceptable format for inclusion in documents by the multifunction peripheral device 102. In either event, the watermark and associated identifier are stored in the repository 110 at step 316 for later use in document processing operations.

When it is determined at step 306 that the user does not have an electronic file containing the desired image for use as a watermark, the user is prompted, at step 308, to scan the document having the image desired to be used as a watermark. The document having the image is then scanned at step 310 and the new watermark is stored in appropriate format with its associated identifier in the repository 110 at step 316. Returning to FIG. 2, following population of the repository 110 at step 202, image processing criteria is suitably selected by the user at step 204. Suitable image processing criteria includes, but is not limited to the type of document processing operation, e.g., facsimile, copying an original document, copying a copy of a document, printing, scanning an original document, scanning a copy of a document, and the like, the type of document, e.g., an original document or a copy, rights set by the system administrator for a specific user, and inclusion of a watermark by the user.

Figure 4:
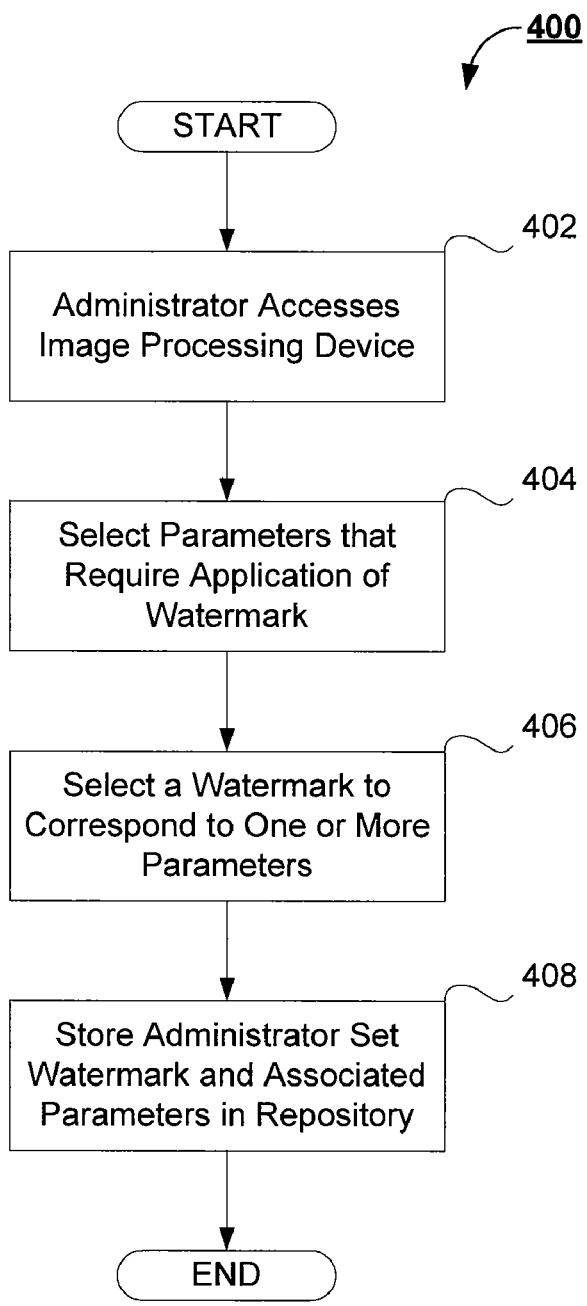
FIG. 4 is a flow chart illustrating the automatic inclusion of a watermark in image processing jobs according to the present invention.

As shown by the flowchart 400 of FIG. 4, the system administrator is capable of setting image processing criteria from the user interface 104 and the personal computer 106 to control inclusion of a watermark. Beginning at step 402, the administrator accesses the multifunction peripheral device 102 via the methods discussed above. At step 404, the administrator sets parameters that require application of a watermark. At step 406, the administrator selects one or more watermarks associated with the parameters. The parameters and associated watermarks are then stored in the repository 110 at step 408. For example, the administrator selects a watermark for inclusion in all copy jobs, a different watermark for inclusion in all print jobs, a third watermark to be used in all transmitted faxes, a different watermark to be included in all received faxes and the like. In addition, the administrator selects a particular watermark to be included in any and all document processing operations corresponding to one user and a different watermark to be included corresponding to a different user.

Returning to the flowchart 200 of FIG. 2, at step 206, an image processing request, such as a print or copy job, is received by the multifunction peripheral device 102 including the selected image processing criteria. As will be understood by those skilled in the art, the system administrator is capable of setting the image processing criteria prior to the user accessing the multifunction peripheral device 102 with the image processing request. At step 208, the image processing criteria is suitably analyzed to determine whether a watermark is required for inclusion in processing the image request. When the image processing criteria is determined to not require inclusion of a watermark, a determination is then made at step 210 whether the user, e.g., the submitter of the image processing request, desires to include a watermark. When the user does not desire inclusion of a watermark, the image processing request is processed normally at step 212. When the user desires to include a watermark, the user is prompted to select a watermark for inclusion at step 214.

Whether the user has selected to include a watermark at step 210, or the image processing criteria requires inclusion of a watermark at step 208, operations flow to step 216, where the designated watermark image data is retrieved from the repository 110. The skilled artisan will appreciate that the watermark retrieved from the repository 110 is the watermark selected by the user at step 210, or alternatively, the watermark designated by the image processing criteria at step 208. At step 218, the multifunction peripheral device 102 begins to loop through the pages of the submitted image processing request, e.g., the associated document submitted in the image processing request for image processing operations. The skilled artisan will appreciate that step 218 denotes the beginning of processing a document having one or more pages, with the term "loop" denoting the advancement from one page in the document to the next page, according to the process defined below. At step 220, the retrieved watermark image data is sent from the repository 110 to the multifunction peripheral device 102 page memory. In the preferred embodiment, the watermark is sent along with a command to overwrite all data presently stored in the page memory. Thus, the page memory is cleared and only contains the retrieved watermark image data. At step 222, the first page image data is sent to the page memory. Preferably, the page image data is sent with an "OR" command, indicating the combining of the watermark image data and the page image data.

The combined watermark and page image data is then transmitted to an image processor of the multifunction peripheral device 102 at step 224. The merged image data is then visually rendered by the multifunction peripheral device 102 at step 226. At step 228, a determination is made whether the document associated with the image processing request contains any additional pages. When the document contains an addition page, the flow returns to step 218 and the next page to be visually rendered is processed. When no additional pages remain to be processed, flow proceeds to step 230, where the image processing request has been fulfilled and imaging operations then terminate.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for selectively inserting a digital watermark into a visual rendering by an image processing device, comprising the steps of:
receiving an image processing request including image data representative of an associated document;
receiving image processing criteria data corresponding to processing of the associated document, the processing criteria including a selection of a scan, print and copy of the document;
populating a repository in the associated memory with data representative of at least one watermark;
determining, via a processor operation in connection with instructions disposed in an associated memory, from the received image processing request, whether a watermark is to be inserted into a visual rendering of the associated document;
determining, via the processor, in accordance with a type of image data, a pre-selected watermark that corresponds to received criteria data and whether a watermark is to be inserted into the visual rendering of the associated document;
retrieving a selected watermark from the associated memory in the event of a positive determination from either determining step; and
generating a visual rendering of the associated document, wherein the visual rendering includes the image date representative of the associated document and the selected watermark.

2. The method for selectively inserting a digital watermark into a visual rendering by an image processing device of claim 1, wherein the determination whether a watermark is to be inserted into the visual rendering of the associated document is based upon the received image processing criteria data.

3. The method for selectively inserting a digital watermark into a visual rendering by an image processing device of claim 2, wherein the received image processing criteria data includes at least one of a document processing operation type and a document type.

4. The method for selectively inserting a digital watermark into a visual rendering by an image processing device of claim 3, wherein the received image processing criteria data is set by one of an administrator and a user.

5. The method for selectively inserting a digital watermark into a visual rendering by an image processing device of claim 1, wherein the step of populating the watermark repository further comprises the steps of: generating data representative of a watermark image; associating data representative of an identifier with the watermark image data; and storing, in the watermark repository, the watermark image data together with the associated identifier data.

6. The method for selectively inserting a digital watermark into a visual rendering by an image processing device of claim 5, wherein the watermark image data is generated by scanning a visual rendering of the watermark.

7. The method for selectively inserting a digital watermark into a visual rendering by an image processing device of claim 5, wherein the watermark image is generated by:
receiving a submitted electronic document; and
printing the submitted electronic document.

8. The method for selectively inserting a digital watermark into a visual rendering by an image processing device of claim 5, wherein the electronic file is transmitted via one of an electronic message and a print job.

9. A system for selectively inserting a digital watermark into a visual rendering by an image processing device, comprising:
means adapted for receiving an image processing request including image data representative of an associated document;
means adapted for receiving image processing criteria data corresponding to processing of the associated document, the processing criteria including a selection of a scan, print and copy of the document;
means adapted for populating a repository in the associated memory with data representative of at least one watermark;
means adapted for determining, via a processor operation in connection with instructions disposed in an associated memory, from the received image processing request, whether a watermark is to be inserted into a visual rendering of the associated document;
means adapted for determining, via the processor, in accordance with a type of image data a pre-selected watermark that corresponds to received criteria data and whether a watermark is to be inserted into the visual rendering of the associated document;
means adapted for retrieving a selected watermark from an associated memory in the event of a positive determination from either determining step; and
means adapted for generating a visual rendering of the associated document, wherein the visual rendering includes the image date representative of the associated document and the selected watermark.

10. The method for selectively inserting a digital watermark into a visual rendering by an image processing device of claim 9, wherein the determination whether a watermark is to be inserted into the visual rendering of the associated document is based upon the received image processing criteria data.

11. The system for selectively inserting a digital watermark into a visual rendering by an image processing device of claim 10, wherein the received image processing criteria data includes at least one of a document processing operation type and a document type.

12. The method for selectively inserting a digital watermark into a visual rendering by an image processing device of claim 11, wherein the received image processing criteria data is set by one of an administrator and a user.

13. The system for selectively inserting a digital watermark into a visual rendering by an image processing device of claim 9, wherein the means adapted for populating the watermark repository further comprises: means adapted for generating data representative of a watermark image; means adapted for associating data representative of an identifier with the watermark image data; and means adapted for storing, in the watermark repository, the watermark image data together with the associated identifier data.

14. The system for selectively inserting a digital watermark into a visual rendering by an image processing device of claim 13, wherein the watermark image data is generated by means adapted for scanning a visual rendering of the watermark.

15. The system for selectively inserting a digital watermark into a visual rendering by an image processing device of claim 13, wherein the watermark image is generated by:
 means adapted for receiving a submitted electronic document; and
 means adapted for printing the submitted electronic document.

16. The system for selectively inserting a digital watermark into a visual rendering by an image processing device of claim 13, wherein the electronic file is transmitted via one of an electronic message and a print job.

\* \* \* \* \*

UNITED STATES PATENT AND TRADEMARK OFFICE
CERTIFICATE OF CORRECTION

PATENT NO.         : 7,616,778 B2                                           Page 1 of 1
APPLICATION NO.    : 12/186316
DATED              : November 10, 2009
INVENTOR(S)        : Rohit Wadhwa, Man Mohan Garg and Harish Thampi Syedmohammed It is certified that error appears in the above-identified patent and that said Letters Patent is hereby corrected as shown below:

In Claim 1, Column 7, line 35, please replace "wherein the visual rendering includes the image date" with --wherein the visual rendering includes the image data--.

In Claim 9, Column 8, line 33, please replace "includes the image date representative of the associated" with --includes the image data representative of the associated--.

Signed and Sealed this

Twenty-second Day of December, 2009

David J. Kappos
*Director of the United States Patent and Trademark Office*